United States Patent
Sherman et al.

(10) Patent No.: US 6,757,475 B2
(45) Date of Patent: Jun. 29, 2004

(54) OPTICAL FIBER ARRAYS WITH PRECISE HOLE SIZING

(75) Inventors: Jonathan Sherman, Caldwell, ID (US);
Randall Miller, Nampa, ID (US);
Robert Sherman, Wilder, ID (US);
Donald Russell, Nampa, ID (US)

(73) Assignee: Fiberguide Industries, Inc., Stirling, NJ (US)

( * ) Notice: Subject to any disclaimer, the term of this patent is extended or adjusted under 35 U.S.C. 154(b) by 0 days.

(21) Appl. No.: 10/460,004

(22) Filed: Jun. 12, 2003

(65) Prior Publication Data

US 2004/0013397 A1 Jan. 22, 2004

Related U.S. Application Data

(60) Provisional application No. 60/388,972, filed on Jun. 14, 2002.

(51) Int. Cl.[7] .............................. G02B 6/00; H01L 21/44
(52) U.S. Cl. .......................... 385/147; 385/52; 385/115; 438/113; 438/630; 438/672
(58) Field of Search ................................ 385/52, 88–94, 385/115, 135–139, 145, 147; 438/113, 597, 630, 637, 672, 704

(56) References Cited

U.S. PATENT DOCUMENTS

| | | | |
|---|---|---|---|
| 5,907,650 A | * | 5/1999 | Sherman et al. .......... 385/85 X |
| 6,174,751 B1 | | 1/2001 | Oka |
| 6,470,123 B1 | | 10/2002 | Sherman et al. |

* cited by examiner

*Primary Examiner*—Phan T. H. Palmer
(74) *Attorney, Agent, or Firm*—Edward Dreyfus, Esq.

(57) ABSTRACT

A method of making and an etchable wafer substrate for use in making optical fiber array plates includes forming a progressively increasing series of metrology holes when the plate holes are formed. The variation between designed plate hole diameter and actual plate hole diameter is determined by sequentially inserting a probe of known designed diameter into the metrology holes to determine the two size-adjacent metrology holes variation. The plate hole diameter can be determined by comparing one of the size-adjacent metrology hole diameter with the respective art work metrology hole diameter. Plate hole diameters can then be corrected for variation with further processing.

12 Claims, 3 Drawing Sheets

METROLOGY HOLES

OPTICAL FIBER ARRAYS WITH PRECISE HOLE SIZING

RELATED APPLICATION

Figure 1:
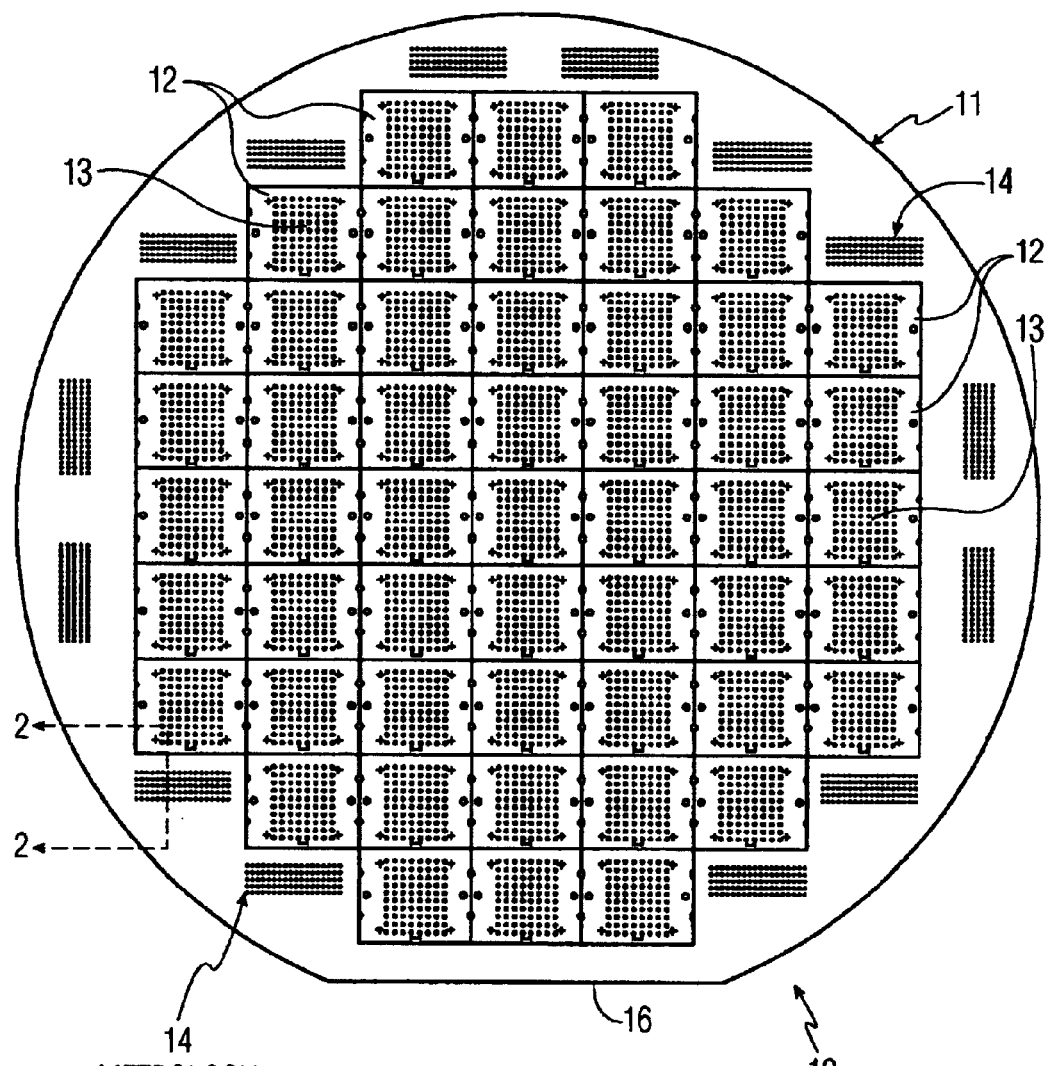

This application claims priority to U.S. Provisional Patent Application Ser. No. 60/388,972 filed Jun. 14, 2002.

BACKGROUND

The present invention relates to optical fiber array apparatus and more particularly to such apparatus that includes a front mask, plate, or wafer having a matrix of small holes and an optical fiber secured in each hole. Examples of these types of apparatus are disclosed in U.S. Pat. No. 5,907,650, U.S. application Ser. No. 09/841,686 now U.S. Pat. No. 6,470,123 and WIPO Publication WO 1/94995 A2. There is a constant need in the art to increase the fiber/hole density in the array apparatus. In the last few years, hole density has increased from 10×10 arrays to as high as 64×64 and higher.

Serious problems arise in the art related to hole positioning and dimensions. In the last several years, manufacturers have turned to using silicon wafers and photo-etching the holes using microchip photo-etching techniques in order to form a matrix of holes with acceptable tolerances. Generally, etching a nominal 125 micron hole in a 400 micron thick wafer can be achieved with a ±2 micron tolerance.

Applicants have found however that such tolerance is unacceptable for a number of reasons. First, the method used by most wafer manufacturers to measure hole sizes in a substrate (e.g., a silicon wafer) is to use a non-contact method of measuring. The problem with trying to measure very small deep holes this way is that the light intensity can vary from hole to hole and change the apparent size of the hole the camera detects. In most cases this variation is small (0.5–1 micron) but this small variation in measurements to the actual sizes may cause a problem when added to other variations. Second, no two measuring systems measure exactly the same. For example, often the wafer manufacturer has a different hole measuring system than the array apparatus manufacturer. The former may use an electron microscope while the latter may use a microviewer. These two systems would likely yield different readings for the same hole dimension. Third, aside from the first mentioned problem, the accuracy of the optical measurement system itself is about ±1 micron.

Accordingly, there is a need in the art for the wafer manufacturer to know the actual size/dimension of the holes in the dies or arrays formed on a wafer substrate so that the wafer manufacturer can take steps to adjust the hole size or know the actual hole size before shipment. Holes sizes can be enlarged by up to several microns by re-oxidizing the hole interior and re-removing the oxide layer off the hole interior. Hole sizes can be reduced by re-oxidizing and re-removing only the surface layer from the front (and rear) surface of the re-oxidized wafer, leaving the re-oxidized layer on the hole interior wall.

PRESENT INVENTION SUMMARY

The present invention solves the forgoing problems and enables the wafer and array apparatus manufacturers to know the precise hole size without the use of optical instruments by forming a series of metrology holes at one or more locations of the wafer. For array holes to be, e.g., 125 micron, the metrology holes may, e.g., fall in the range of 114 to 130 microns and increasing in, e.g., 0.5 microns increments from 114 micron. When the wafer is preliminarily completed, a thin tool or stripped cladded core of a fiber known to be 125 micron in diameter is inserted through one of the larger diameter metrology holes. If it passes through such hole then it is withdrawn and inserted into the next smaller hole. This sequence is repeated until the tool or fiber fails to pass through a hole indicating the adjacent larger metrology hole is the proper size for all the array holes. Since the wafer manufacturer can identify the proper hole and relate it back to the photolithography artwork hole size, it then can determine the variation between the designed and the actual size of all array holes in the wafer dies at least in the respective metrology wafer region. For example, if the 125 micron tool first fails on a hole for which the photolith hole on the artwork was designed to produce a 121 micron metrology hole, then all holes in that region or on that wafer are 3.5 microns too large. Alternately, if the 125 micron tool first fails to pass through a metrology hole designed to be 128 micron then the manufacturer knows all holes are 3.5 microns too small. Corrective action can be taken before the wafer ships.

By placing the metrology hole patterns around the perimeter of the wafer, the differences or variation in hole sizes between designed and actual can be determined across the wafer.

DETAILED DESCRIPTION OF EXEMPLARY EMBODIMENT OF INVENTION

Figure 2:
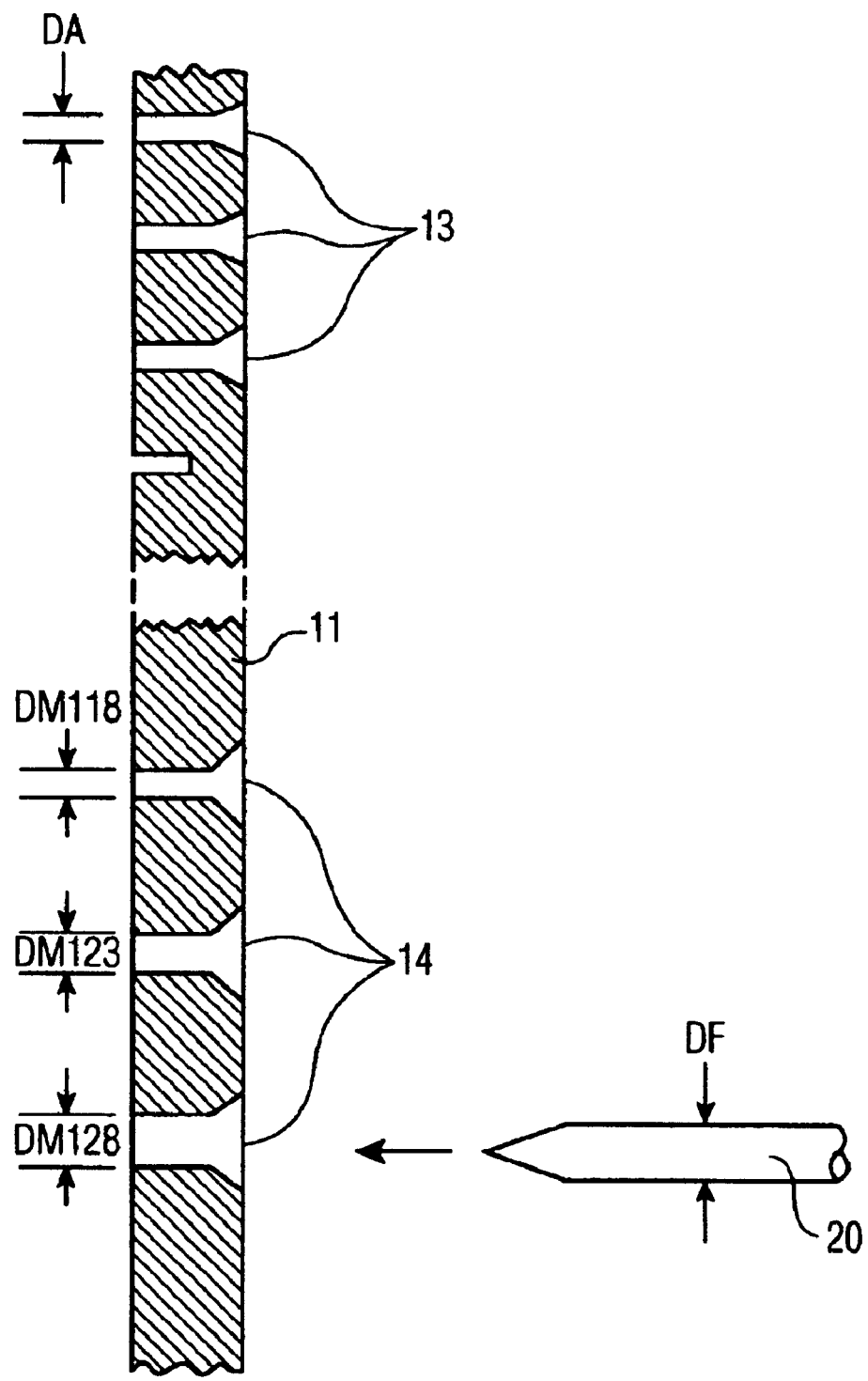
Figure 3:
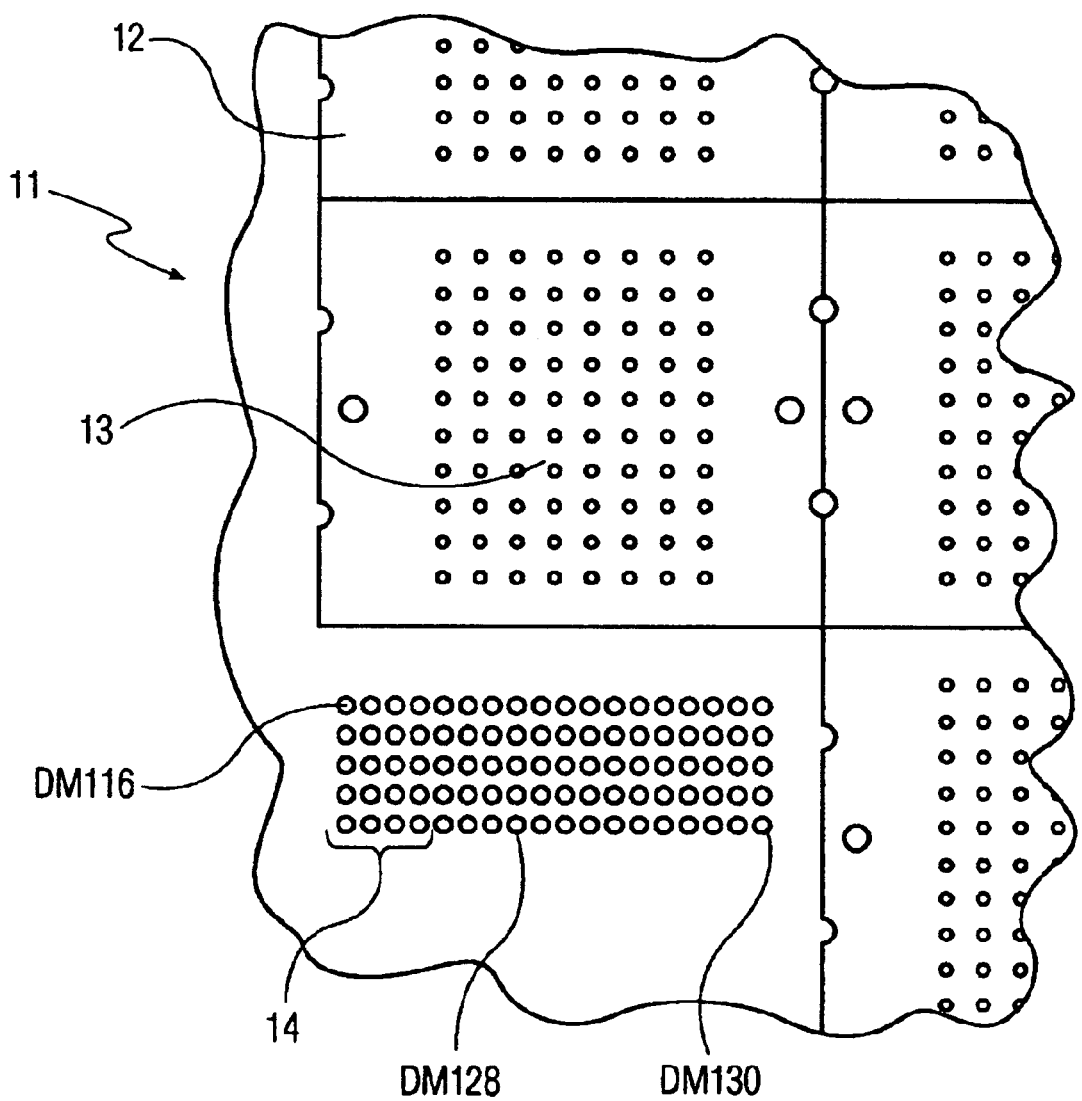

With reference to FIGS. 1–3, a wafer 10 made pursuant to the present invention includes substrate 11 made of crystalline silicon or other suitable etchable material and suitable for well known photolithography etching techniques commonly used in the micro-chip or semiconductor manufacturing industry. Standard artwork (not shown) is prepared for use to create opening patterns in an oxide layer that covers the front and/or rear faces of substrate 11. Dry etching techniques are preferably used to create the plurality of dies 12 each having an array of holes 13 opening to the front face of substrate 11. An oxide hole pattern on the rear face serves to enable a wet KOH etch to the backside of holes 13 that flares outward toward the rear surface of substrate 11. Substrate 14 includes a standard flat edge 16 aligned with the <100> crystal plane so that substrate 11 can be properly indexed with the one or more photo resist masks used in the process.

According to the principles of the present invention, one or more sets of metrology holes 14 are also etched simultaneously with the etching of holes 13. It is preferred that at least four sets of metrology holes be provided, spaced around the periphery of the die areas. In the example of FIG. 1, fourteen metrology sets are shown. As mentioned above, metrology hole diameter range in 0.5 micron increments from 114–130 microns and, like holes 13, their rear portions are flared toward substrate 11 rear face to aid sizing fiber or tool 20 insertion from the rear. As seen in FIG. 2, the smallest diameter of each array hole 13 is represented by DA. The various diameter of metrology holes is represented by DM118, DM123, DM128. Metrology holes are arranged in a logical pattern so that each hole in the pattern can be identified by its position which position corresponds with the same position in the congruous photolith artwork. This would be the same for all metrology holes in all metrology hole sets on substrate 11.

Sizing tool 20 should have a precise diameter DF which, in this example, would be 125 microns±0.5 microns. Tool 20 could be made of metal or other suitable material. If desired a stripped cladded core fiber having a diameter of 125 microns could be used for this purpose as well. The tip of tool 20 should be tapered to facilitate insertion.

Method of Determining Actual Array Hole Size Variation from Designed hole size:

A. Hole Formation
1. Front Face
   Provide substrate
   Oxidize substrate
   Prepare photomask
   Apply photoresist
   Remove oxide pattern
   Dry etch
   Remove oxide
2. Rear Face
   Provide substrate
   Oxidize rear face
   Prepare photomask
   Apply photoresist
   Remove oxide pattern
   Wet etch
   Remove oxide
B. Sizing 1. Insert tool 20 through metrology hole—repeat until tool 20 cannot extend through metrology hole
2. Identify hole closest to but larger than DF as DMX hole
3. Identify corresponding hole on artwork pattern and determine designed hole size for such artwork hole and identify this artwork hole as AWMY
4. Note plus or minus variation from designed artwork hole size (AWMY) and actual metrology hole size DMX C. Correction
1. Apply re-oxidation and/or re-remove the oxide for variation adjustment to walls of holes 13

An alternate sizing method would include using as DMX the largest hole through which tool 20 fails to pass through instead of the smallest hole that tool 20 passed through.

What is claimed is:

1. A wafer substrate made of etchable material for use in the manufacture of optical fiber array plates having a plurality of holes for seating a plurality of optical fibers, said substrate comprising:
   at least one first zone defining at least one of said plates in which the fiber seating holes are intended to have a predetermined diameter but instead said holes have an actual diameter, and
   at least one second zone defining a series of metrology holes, said hole series comprising one hole having the same intended predetermined diameter but instead said hole has an actual diameter, a lower hole series having progressively and incrementally smaller predetermined intended diameters but instead have progressively and incrementally smaller actual diameters, and an upper series having progressively and incrementally larger predetermined intended diameters but instead have progressively and incrementally larger actual diameters,
   wherein said metrology hole series can receive an elongated element having a known actual diameter equal to the predetermined diameter so that when said element is sequentially inserted through or attempted to be inserted through the two size-adjacent metrology holes that include one that permits insertion and the other that prevents insertion, the difference between the intended predetermined diameter and the actual diameter of the fiber seating plate holes can be determined.

2. A wafer according to claim 1, wherein said first zone includes a plurality of said plates and the wafer includes a plurality of said second zones.

3. A wafer according to claim 2, wherein said plurality of plates are clustered substantially contiguous to one another and said plurality of zones are spaced from each other and are positioned outside of the clustered plurality of plates.

4. A wafer according to claim 1, wherein said wafer includes a front surface and a rear surface and said intended and actual plate hole diameters comprise the smallest hole diameter of each plate hole near or at the front surface.

5. A wafer according to claim 4, wherein each plate hole is flared outward in the direction toward the wafer rear surface.

6. A method of making a wafer substrate made of etchable material for use in the manufacture of optical fiber array plates having a plurality of holes for seating a plurality of optical fibers, said method comprising
   forming on said substrate at least one first zone defining at least one of said plates in which the fiber seating holes are intended to have a predetermined diameter but instead said holes have an actual diameter,
   forming on said substrate at least one second zone defining a series of metrology holes, said hole series comprising one hole having the same intended predetermined diameter but instead said hole has an actual diameter, a lower hole series having progressively smaller predetermined intended diameters but instead have progressively smaller actual diameters, and an upper series having progressively larger predetermined intended diameters but instead have progressively larger actual diameters,
   sequentially inserting into said metrology hole series an elongated element having a known actual diameter equal to the predetermined intended diameter,
   identifying two metrology holes by sequentially inserting through or attempt to insert through the two size-adjacent metrology holes that include one that permits insertion and the other that prevents insertion, and
   determining the difference between the intended predetermined diameter and the actual diameter of the fiber seating plate holes using the identity of said two-size adjacent metrology holes.

7. A method of making a wafer according to claim 6, further including processing the wafer further to modify the plate holes actual diameters to substantially equal the intended hole diameters.

8. A method of making a wafer according to claim 7, wherein said further processing includes oxidizing the inner walls of said plate holes.

9. A method of making a wafer according to claim 7, wherein said further processing includes removing oxidized material from the walls of said plate holes.

10. A method of making a wafer according to claim 7, wherein said further processing includes removing material from the walls of said plate holes.

11. A method of making a wafer according to claim 7, wherein said determining includes identifying the smaller or larger of the said two size-adjacent holes,
    determining the corresponding intended metrology hole size from the respective art work pattern,
    determining the plus or minus plate hole variation from the intended metrology hole size to the actual metrology hole size.

12. The product made by the process of claim 7 or 8 or 9 or 10 or 11.

* * * * *